(12) United States Patent
Nam et al.

(10) Patent No.: US 8,872,843 B2
(45) Date of Patent: Oct. 28, 2014

(54) METHOD FOR EDITING IMAGES IN A MOBILE TERMINAL

(75) Inventors: Seung-A Nam, Gumi-si (KR);
Chung-Kyu Lee, Seoul (KR);
Un-Kyong Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1669 days.

(21) Appl. No.: 11/171,364

(22) Filed: Jul. 1, 2005

(65) Prior Publication Data
US 2006/0001758 A1 Jan. 5, 2006

(30) Foreign Application Priority Data

Jul. 2, 2004 (KR) .............................. 10-2004-51563
May 16, 2005 (KR) .............................. 10-2005-40794

(51) Int. Cl.
*G09G 5/00* (2006.01)
*G06T 11/60* (2006.01)

(52) U.S. Cl.
CPC ...................................... *G06T 11/60* (2013.01)
USPC .......................................... 345/619; 345/629

(58) Field of Classification Search
USPC ........................... 345/619, 629, 632, 636, 638
See application file for complete search history.

(56) References Cited

U.S. PATENT DOCUMENTS

| | | | | |
|---|---|---|---|---|
| 4,785,420 A | * | 11/1988 | Little ............................. | 704/271 |
| 5,742,779 A | * | 4/1998 | Steele et al. .................... | 715/839 |
| 5,784,001 A | * | 7/1998 | Deluca et al. ................ | 340/7.56 |
| 6,044,248 A | * | 3/2000 | Mochizuki et al. .......... | 340/7.47 |
| 6,445,396 B1 | * | 9/2002 | Suzuki .......................... | 345/636 |
| 6,525,836 B1 | * | 2/2003 | Ito et al. ....................... | 358/1.18 |
| 6,567,983 B1 | * | 5/2003 | Shiimori ....................... | 725/105 |
| 6,587,596 B1 | * | 7/2003 | Haeberli ....................... | 382/283 |
| 6,822,756 B1 | * | 11/2004 | Cok et al. ...................... | 358/1.9 |
| 6,941,276 B2 | * | 9/2005 | Haeberli ...................... | 705/26.5 |
| 6,961,446 B2 | | 11/2005 | Imagawa et al. ............. | 382/103 |
| 6,993,553 B2 | * | 1/2006 | Kaneko et al. ................ | 709/201 |
| 7,020,493 B2 | * | 3/2006 | Ohmura et al. .............. | 455/566 |
| 7,113,809 B2 | * | 9/2006 | Noesgaard et al. ........... | 455/566 |

(Continued)

FOREIGN PATENT DOCUMENTS

CN 1200537 C 5/2005
JP 2002-315060 A 10/2002

(Continued)

OTHER PUBLICATIONS

Sendo X User Guide; pp. 1-10, 2003.

*Primary Examiner* — M Good Johnson
(74) *Attorney, Agent, or Firm* — The Farrell Law Firm, P.C.

(57) ABSTRACT

A method for adding image effects to an existing image, selectively deleting the added image effects or storing an image with various image effects added in a mobile terminal are provided. The method comprises: displaying an image; selecting a frame and adding the selected frame to the image; selecting at least one icon and adding the selected icon to the image; inputting at least one text message and adding the input text message to the image; repeating the addition of the image effects; and randomly selecting one or more of the image effects added to the image and deleting or modifying each selected image effect. There is also provided a method for storing an image, which comprises when saving an image is selected, extracting information about an image effect added to the image; and storing image information comprising the extracted image effect information and original image information.

22 Claims, 18 Drawing Sheets

(56) References Cited

U.S. PATENT DOCUMENTS

| | | | |
|---|---|---|---|
| 7,130,394 B2* | 10/2006 | Koyama et al. | 379/93.23 |
| 7,130,618 B2* | 10/2006 | Yokoyama | 455/414.1 |
| 7,330,100 B2* | 2/2008 | Yu | 340/5.61 |
| 7,372,470 B2* | 5/2008 | Kim et al. | 345/593 |
| 7,391,445 B2* | 6/2008 | Herberger et al. | 348/239 |
| 7,502,527 B2* | 3/2009 | Momose et al. | 382/284 |
| 7,518,642 B2* | 4/2009 | Silverbrook | 348/239 |
| 7,522,206 B2* | 4/2009 | Miki et al. | 348/333.01 |
| 7,730,398 B2* | 6/2010 | Klassen et al. | 715/255 |
| 7,751,650 B2* | 7/2010 | Tada et al. | 382/285 |
| 8,269,793 B2* | 9/2012 | Elgar et al. | 345/629 |
| 2001/0034776 A1* | 10/2001 | Abe et al. | 709/218 |
| 2001/0055983 A1* | 12/2001 | Ohmura et al. | 455/566 |
| 2002/0031262 A1 | 3/2002 | Imagawa et al. | 382/190 |
| 2002/0055992 A1* | 5/2002 | King et al. | 709/221 |
| 2003/0011643 A1* | 1/2003 | Nishihata | 345/810 |
| 2003/0069004 A1* | 4/2003 | Hamynen et al. | 455/412 |
| 2003/0160824 A1* | 8/2003 | Szumla | 345/769 |
| 2004/0012615 A1 | 1/2004 | Jang | |
| 2004/0021555 A1* | 2/2004 | Faris | 340/7.52 |
| 2004/0085360 A1* | 5/2004 | Pratt et al. | 345/773 |
| 2004/0093432 A1* | 5/2004 | Luo et al. | 709/247 |
| 2004/0120009 A1 | 6/2004 | White et al. | |
| 2004/0133924 A1* | 7/2004 | Wilkins et al. | 725/135 |
| 2004/0239686 A1* | 12/2004 | Koyama et al. | 345/620 |
| 2004/0250205 A1* | 12/2004 | Conning | 715/517 |
| 2005/0097463 A1* | 5/2005 | Yu | 715/531 |
| 2005/0184999 A1* | 8/2005 | Daioku | 345/589 |
| 2006/0125819 A1* | 6/2006 | Hakansson | 345/418 |

FOREIGN PATENT DOCUMENTS

| | | |
|---|---|---|
| KR | 10-2004-0008836 A | 1/2004 |
| WO | WO-03/046834 A1 | 6/2003 |
| WO | WO 2004/054244 A1 | 6/2004 |

* cited by examiner

METHOD FOR EDITING IMAGES IN A MOBILE TERMINAL

PRIORITY

This application claims the benefit under 35 U.S.C. 119(a) of applications entitled "Method for Editing Images in Mobile Terminal" filed with the Korean Intellectual Property Office on Jul. 2, 2004 and assigned Serial No. 2004-51563 and on May 16, 2005 and assigned Serial No. 2005-40794, the entire contents of both of which are hereby incorporated by reference.

BACKGROUND OF THE INVENTION

1. Field of the Invention

The present invention relates to a method for editing images in a mobile terminal. More particularly, the present invention relates to a method for adding various image effects to an existing image, selectively deleting the added image effects and storing an image with image effects added.

2. Description of the Related Art

Future mobile communication terminals will be more capable than current mobile phones of providing high-speed transmission of packet data and image data over voice channels.

Current mobile terminals having functions to send or receive image data can store an image received from a base station or transmit any acquired image to the base station. Mobile terminals with an embedded camera can take pictures and display them on a display section. The camera may comprise a camera sensor such as a charge coupled device (CCD) sensor or a complementary metal-oxide-semiconductor (CMOS) sensor. The display section may comprise a Liquid Crystal Display (LCD). Due to the tendency toward compact-sized mobile terminals, cameras embedded in the mobile terminals are also becoming smaller. The mobile terminals can display the photographed pictures as moving or still pictures or can send the photographed pictures to the base station.

There is a growing demand for image mail services on a mobile terminal. To meet this demand, image editing functions that allow users to edit an image on a mobile terminal have also been developed. Such functions include zooming-in or zooming-out of a picture stored in the mobile terminal or zooming-in or zooming-out of a composite of two or more pictures. Another image editing function is the creation of various image effects over an existing image, which will enable a wider range of services on mobile terminals.

SUMMARY OF THE INVENTION

Accordingly, the present invention has been made to solve the problems occurring in the prior art, and an object of the present invention is to provide a method for adding various image effects to an existing image in a mobile terminal.

Another object of the present invention is to provide a method for selectively deleting image effects added to an existing image in a mobile terminal.

Still another object of the present invention is to provide a method for storing image information of an image with various image effects added in a mobile terminal.

Still another object of the present invention is to provide a method for outputting and displaying an image corresponding to image information stored in a mobile terminal.

Still another object of the present invention is to provide a method for combining an existing image with preset image effects and displaying the combined image on a mobile terminal.

In order to accomplish the above objects of the present invention, there is provided a method for adding image effects to an existing image in a mobile terminal. The method comprises: displaying an image; selecting a frame and adding the selected frame to the image; selecting at least one icon and moving the selected icon to a desired location on the image; and inputting at least one text message and moving the input text message to a desired location on the image.

In accordance with another aspect of the present invention, there is provided a method for adding image effects to an existing image in a mobile terminal. The method comprises: displaying an image; when an addition of a frame is selected from an image editing menu, adding a selected frame to the image; when an addition of an icon is selected from the image editing menu and moving the selected icon to a desired location on the image with the frame; and when addition of text is selected from the image editing menu, inputting at least one text message and moving the input text message to a desired location on the image with the frame and the icon.

In accordance with still another aspect of the present invention, there is provided a method for modifying or deleting image effects added to an existing image in a mobile terminal. The method comprises: displaying an image; when a focus function is selected from an image editing menu, displaying all image effects added to the image; randomly selecting one or more of the displayed image effects and deleting each selected image effect; and randomly selecting one or more of the displayed image effects and modifying each selected image effect.

In accordance with still another aspect of the present invention, there is provided a method for deleting image effects added to an existing image in a mobile terminal. The method comprises: displaying an image with image effects added; when deletion of an image effect is selected from an image editing menu, displaying the image effects added to the image; randomly selecting one or more of the displayed image effects to be deleted; when a frame is selected from the displayed image effects, deleting the selected frame and displaying the image without the frame; when an icon is selected from the displayed image effects, deleting the selected icon and displaying the image without the icon; and when text is selected from the displayed image effects, deleting the selected text and displaying the image without the text.

In accordance with still another aspect of the present invention, there is provided a method for modifying image effects added to an existing image in a mobile terminal. The method comprises: displaying an image with image effects added; when modification of an image effect is selected from an image editing menu, displaying the image effects added to the image; randomly selecting one or more of the displayed image effects to be modified; when a frame is selected from the displayed image effects, replacing the selected frame with another frame; when an icon is selected from the displayed image effects, relocating the selected icon on the image; and when text is selected from the displayed image effects, changing the selected text to a different text message, color, size or location.

In accordance with still another aspect of the present invention, there is provided a method for adding image effects to an existing image and selectively modifying or deleting the added image effects in a mobile terminal. The method comprises: displaying an image; selecting a frame and adding the selected frame to the image; selecting at least one icon and adding the selected icon to the image; inputting at least one text message and adding the input text message to the image; repeating the addition of the image effects; and randomly selecting one or more of the image effects added to the image and deleting or modifying each selected image effect.

In accordance with still another aspect of the present invention, there is provided a method for storing an image. The method comprises extracting information about an image effect added to the image when a save image option is selected; and storing image information comprising the extracted image effect information and original image information.

In accordance with still another aspect of the present invention, there is provided a method for displaying an image on a mobile terminal. The method comprises searching for image information of a selected image; extracting an original image and an image effect based on the detected image information; and displaying the extracted original image with the extracted image effect added.

BRIEF DESCRIPTION OF THE DRAWINGS

The above and other objects, features and advantages of the present invention will be more apparent from the following detailed description taken in conjunction with the accompanying drawings, in which.

Throughout the drawings, the same or similar elements are denoted by the same reference numerals.

DETAILED DESCRIPTION OF EXEMPLARY EMBODIMENTS

Figure 1:
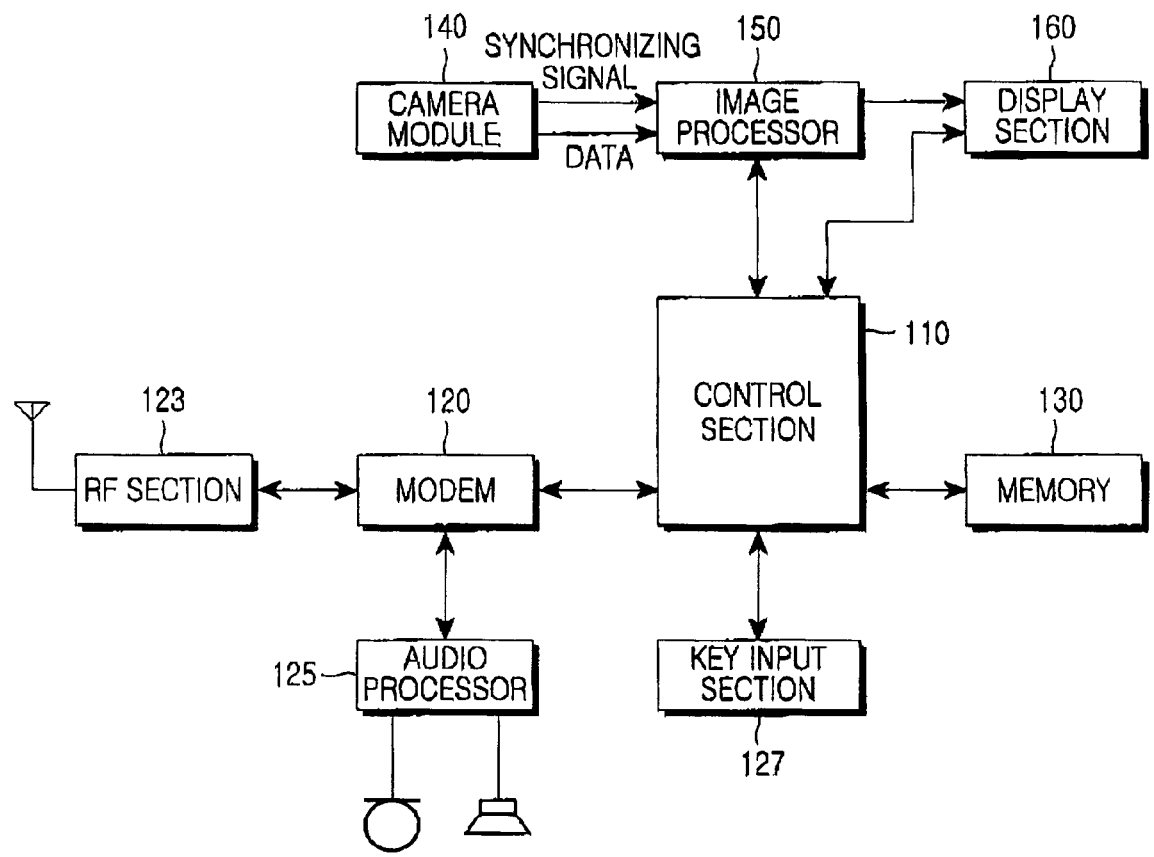
FIG. 1 is a view illustrating the structure of a mobile terminal according to an embodiment of the present invention.

Hereinafter, embodiments of the present invention will be described with reference to the accompanying drawings. Throughout the drawings, the same element is designated by the same reference numeral or character. Also, in the following description of the present invention, a detailed description of known functions and configurations incorporated herein will be omitted for conciseness.

FIG. 1 shows the structure of a mobile terminal equipped with a camera according to an embodiment of the present invention.

Referring to FIG. 1, a radio frequency (RF) section 123 performs a wireless communication function. The RF section 123 comprises a RF transmitter (not shown) for performing upward conversion and amplification of the frequency of a transmitted signal and an RF receiver (not shown) for amplifying a received signal with low noise and performing downward conversion of the frequency of the signal. A modem 120 comprises a transmitter (not shown) for coding and modulating a transmitted signal and a receiver (not shown) for demodulating and decoding a received signal. An audio processor 125 may comprise a codec which comprises a data codec for processing packet data and an audio codec for processing an audio signal such as a speech signal. The audio processor 125 converts a digital audio signal output from the modem 120 into an analog signal through the audio codec and reproduces the analog signal. Also, the audio processor 125 converts an analog audio signal generated from a microphone into a digital audio signal and transmits the digital audio signal to the modem 120. The codec can be provided as an independent element or included in a control section 110.

A memory 130 may comprise a program memory and a data memory. The program memory comprises programs for controlling general operations of the mobile terminal and those for controlling the addition or selective deletion of image effects, and the storage and display of an image with image effects added according to an embodiment of the present invention. The data memory temporarily stores data generated during implementation of the above programs. Also, the memory 130 may store various types of image effects and images with image effects added according to an embodiment of the present invention. The memory 130 may store only image information of the images with image effects added according to an embodiment of the present invention. In addition, the memory 130 may store only image effect information of the image effects added to existing images according to an embodiment of the present invention.

The image information comprises original image information and image effect information. The original image information refers to a stored original image number. The image effect information may be frame information, icon information and/or text information according to the types of image effects. The frame information refers to a frame number representing the type of frame added to the original image. The icon information comprises an icon number and an icon position value of the icon added to the original image. The text information comprises a message, color, size and position value of the text added to the original image. A control section 110 controls the overall operations of the mobile terminal. The control section 110 may comprise the modem 120 and the codec. Under the control of the control section 110, a selected image effect can be added to an existing image according to an embodiment of the present invention. Under the control of the control section 110, an added image effect can be deleted from the image according to an embodiment of the present invention. Under the control of the control section 110, only image information of an image with image effects added can be stored according to an embodiment of the present invention. Also, under the control of the control section 110, only image effect information of image effects added to an existing image can be stored according to an embodiment of the present invention.

When an image of which image information only is stored is selected, the control section 110 controls the extraction of the original image and image effects corresponding to the image information and display of the original image with the image effects added. In addition, under the control of the control section 110, various existing images can be combined and displayed with preset image effects according to an embodiment of the present invention.

A camera module 140 is used to photograph an object. The camera module 140 comprises a camera sensor for converting a photographed optical signal into an electrical signal and a signal processor for converting an analog image signal photographed by the camera sensor into digital data. If the camera sensor is a charge coupled device (CCD) sensor, the signal processor can be a digital signal processor (DSP). The camera sensor and the signal processor can be either integrated into a single element or separated into independent elements.

An image processor 150 generates picture data for displaying an image signal output from the camera module 140. The image processor 150 processes image signals output from the camera module 140 in frames. Also, the image processor 150 adjusts the frame image data to conform to the size and features of a display section 160 and outputs the adjusted frame image data. The image processor 150 comprising an image codec compresses the frame image data displayed on the display section 160 in a preset manner or restores the compressed frame image data to the original frame image data. The image codec is selected from a variety of still or moving picture codecs, such as Joint Photographic Experts Group (JPEG) codec, Moving Picture Experts Group 4 (MPEG4) codec or Wavelet codec. If the image processor 150 has an on screen display (OSD) function, it can output OSD data according to the displayed picture size under the control of the control section 110.

The display section 160 displays image data output from the image processor 150 or user data output from the control section 110. When using an LCD, the display section 160 may comprise an LCD controller, a memory for storing image data and an LCD device. When the LCD is a touch screen, it can serve as an input section. The display section 160 can display an image with an image effect or effects added according to an embodiment of the present invention. A key input section 127 is provided with keys for inputting numbers and characters and function keys for setting up various functions. The key input section 127 may also include function keys for adding or deleting an image effect according to an embodiment of the present invention.

Referring to FIG. 1, if a user (caller) sets an outgoing call mode after dialing by using the keypad 127, the control section 110 will detect the mode and will process the dialed information received through the modem 120. The control section 110 converts the dialed information into an RF signal through the RF section 123 and outputs the RF signal. A reply signal generated from a recipient is detected by the RF section 123 and the modem 120. The audio processor 125 then forms a voice communication path so that the user can communicate with the recipient. When detecting an incoming call, the control section 110 controls the audio processor 125 to generate a ringing signal. When the user replies to the incoming call, the control section 110 detects the reply and controls the audio processor 125 to form a voice communication path so that the user can receive the incoming call. Although voice communications in the incoming or outgoing call mode have been described, the control section 110 can also perform data communications to receive or transmit packet data or image data. In a standby mode or a messaging mode, the control section 110 displays text data processed by the modem 120 on the display section 160.

Hereinafter, the image editing function of the mobile terminal according to an embodiment of the present invention will be explained in detail with reference to FIGS. 2 to 10. Although frames, icons and text will be described below as examples of image effects, any other types of image effects can be used according to an embodiment of the present invention.

Figure 2:
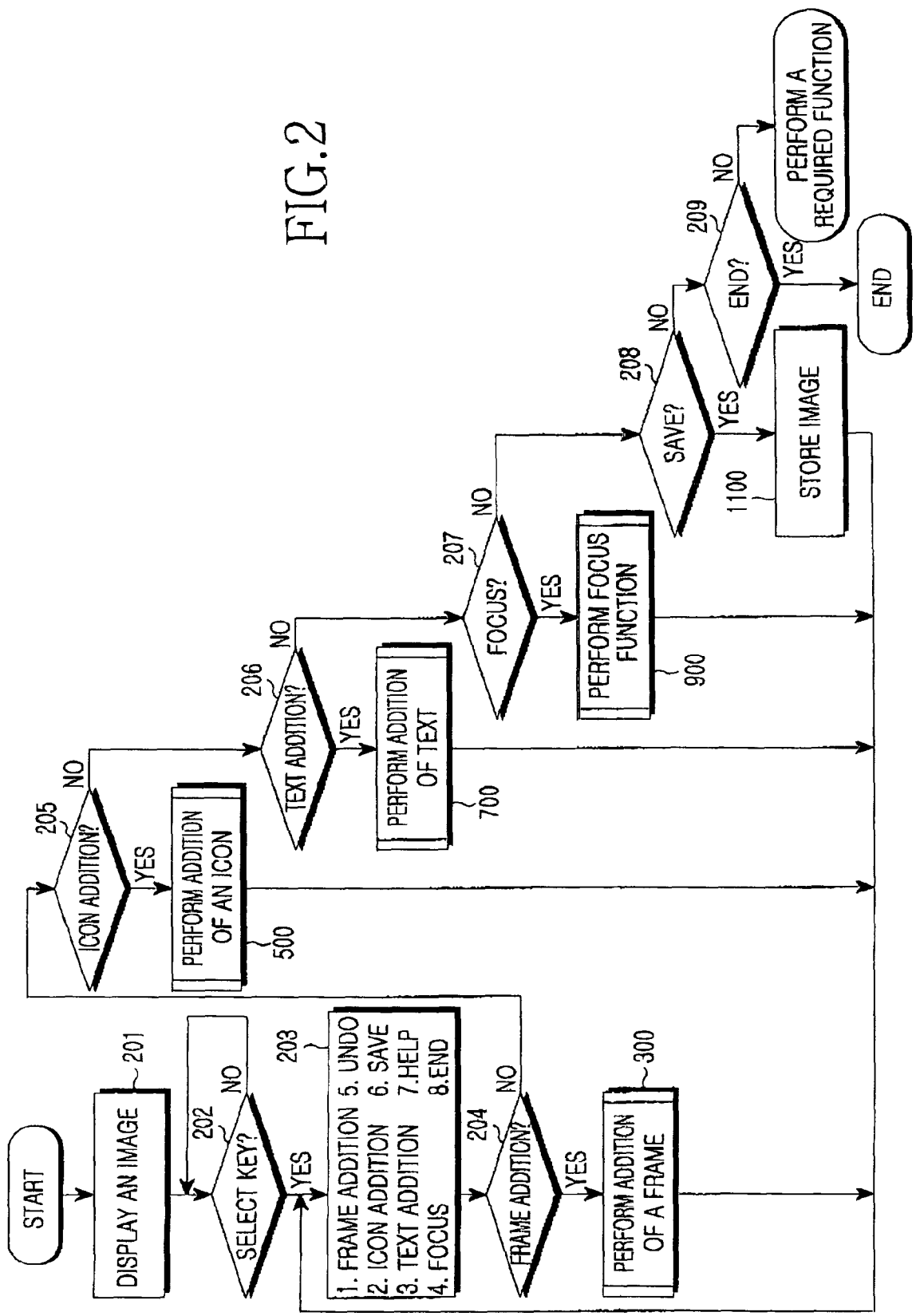
FIG. 2 is a flow chart illustrating a process of adding image effects to an existing image and selectively deleting the added image effects in a mobile terminal according to an embodiment of the present invention.
Figure 3:
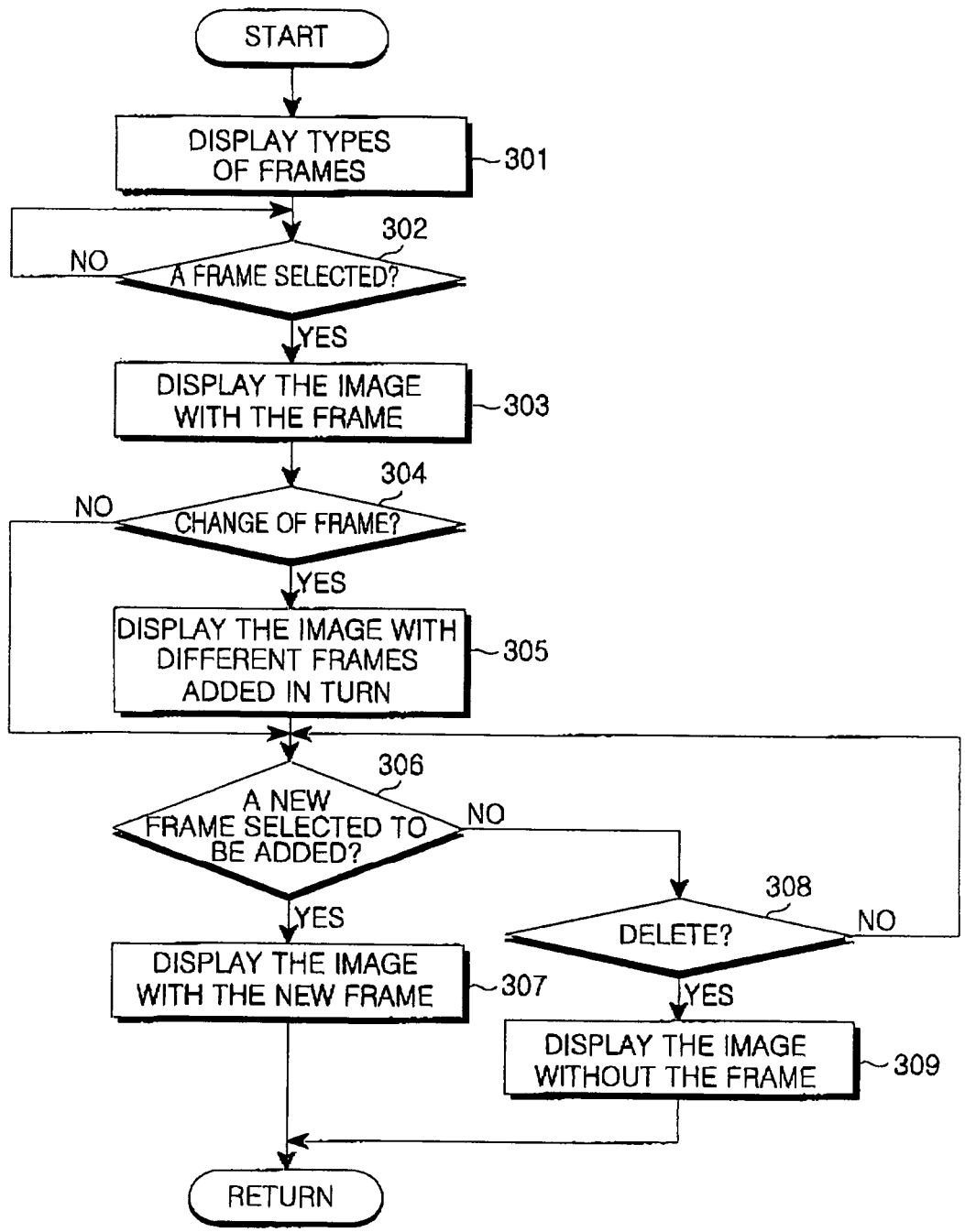
FIG. 3 is a flow chart illustrating showing the addition of a frame to an existing image as an image effect shown in FIG. 2.
Figure 4A:
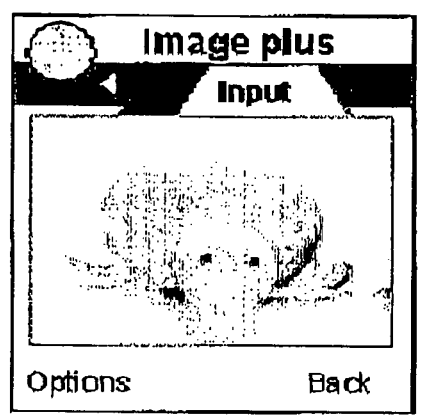
FIGS. 4A to 4C are images illustrating the process shown in FIG. 3.
Figure 4B:
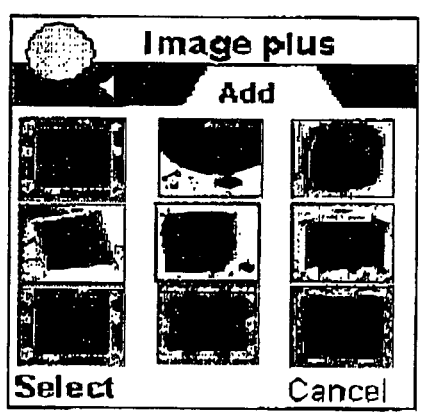
Figure 4C:
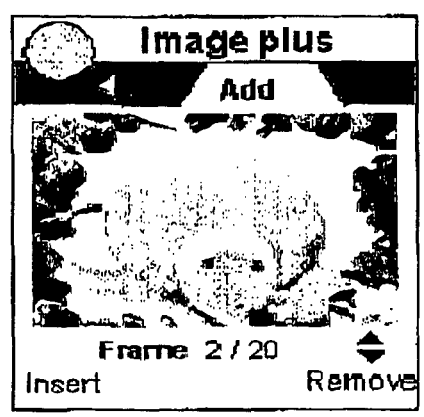
Figure 5:
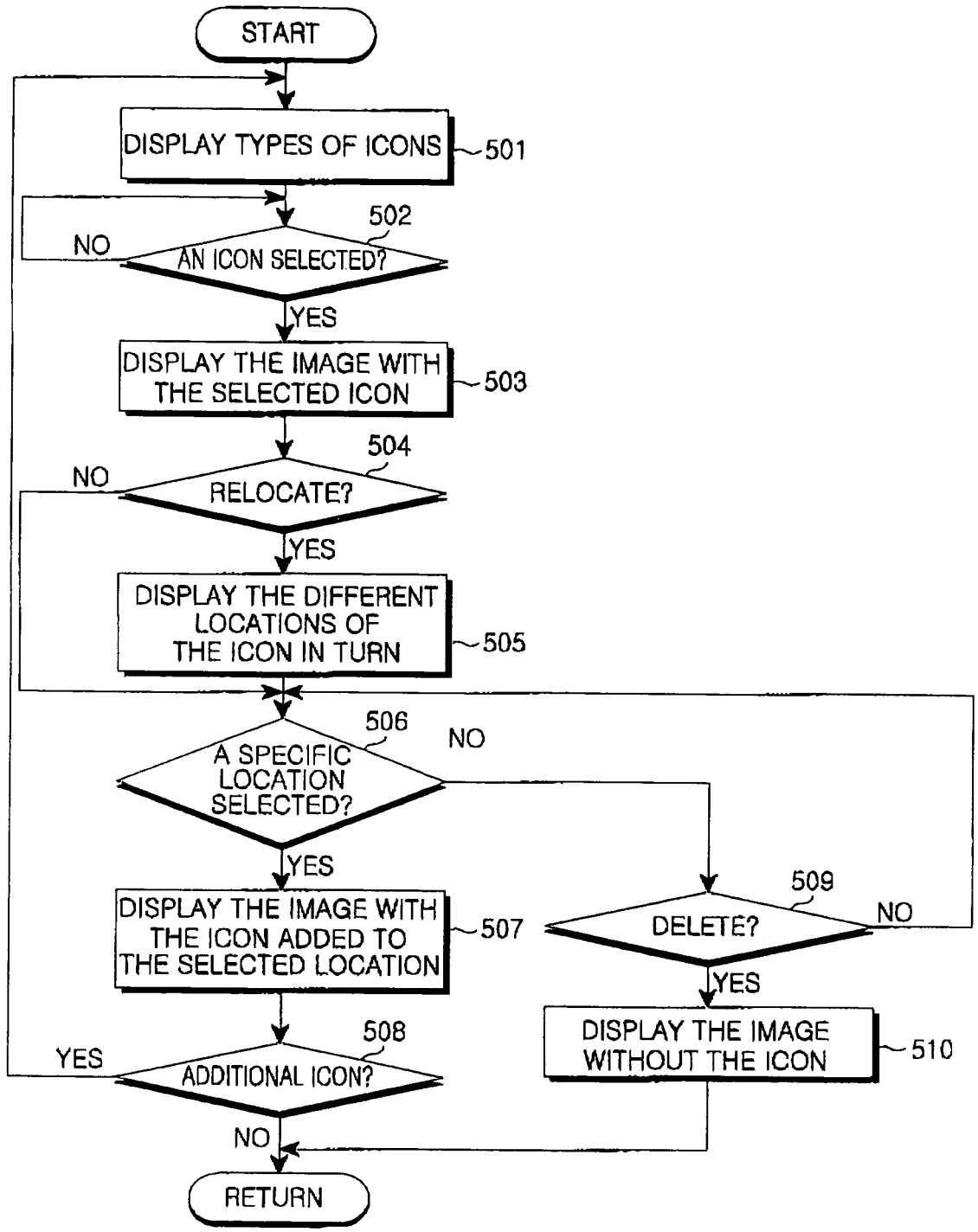
FIG. 5 is a flow chart illustrating the addition of an icon to an existing image as another image effect shown in FIG. 2.
Figure 6A:
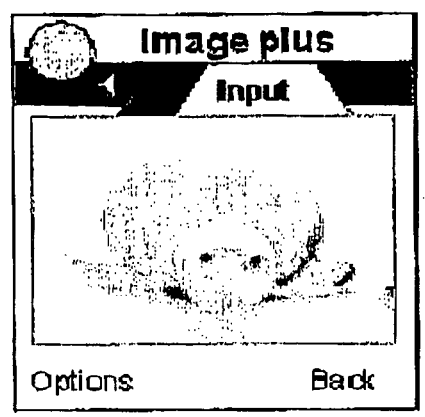
FIGS. 6A to 6C are images illustrating the process shown in FIG. 5.
Figure 6B:
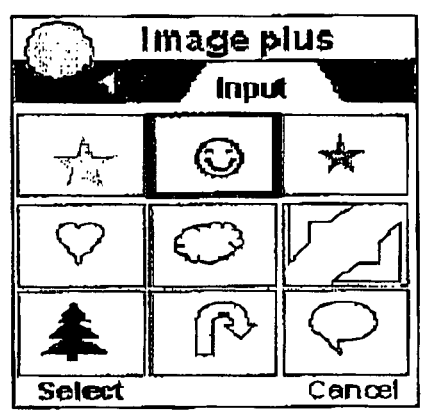
Figure 6C:
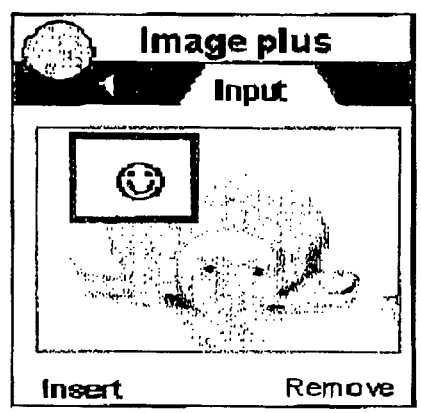
Figure 7:
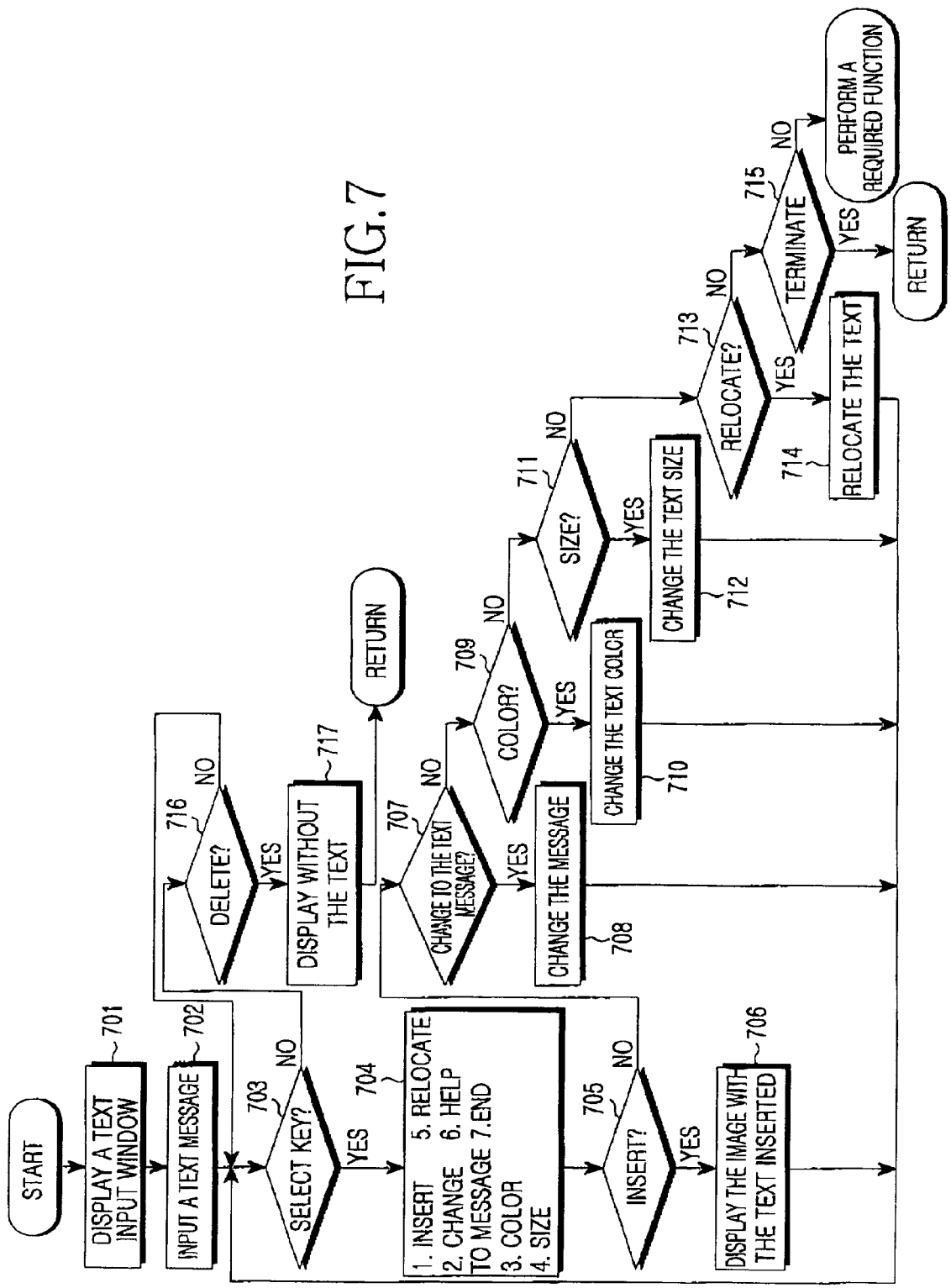
FIG. 7 is a flow chart illustrating the addition of an icon to an existing image as still another image effect shown in FIG. 2.
Figure 8A:
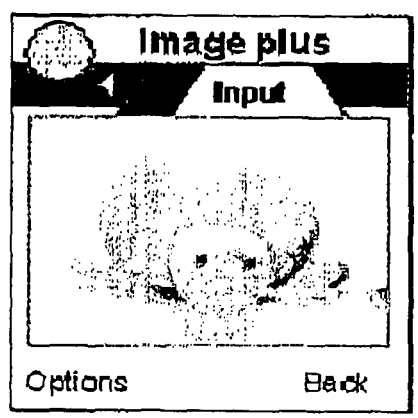
FIGS. 8A to 8C are images illustrating the process shown in FIG. 7.
Figure 8B:
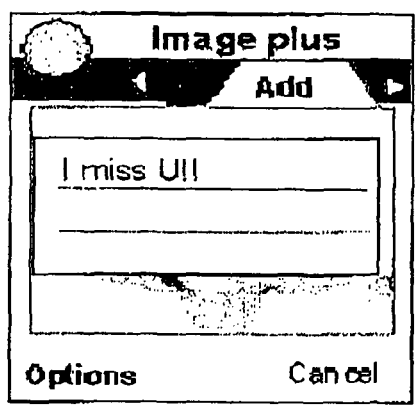
Figure 8C:
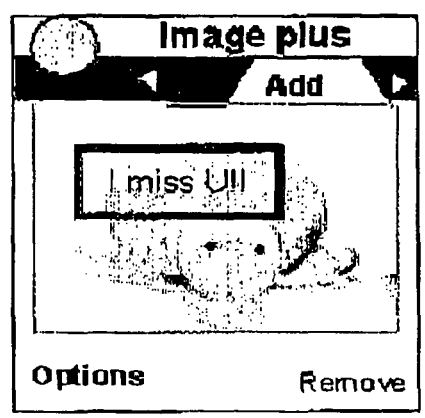
Figure 9A:
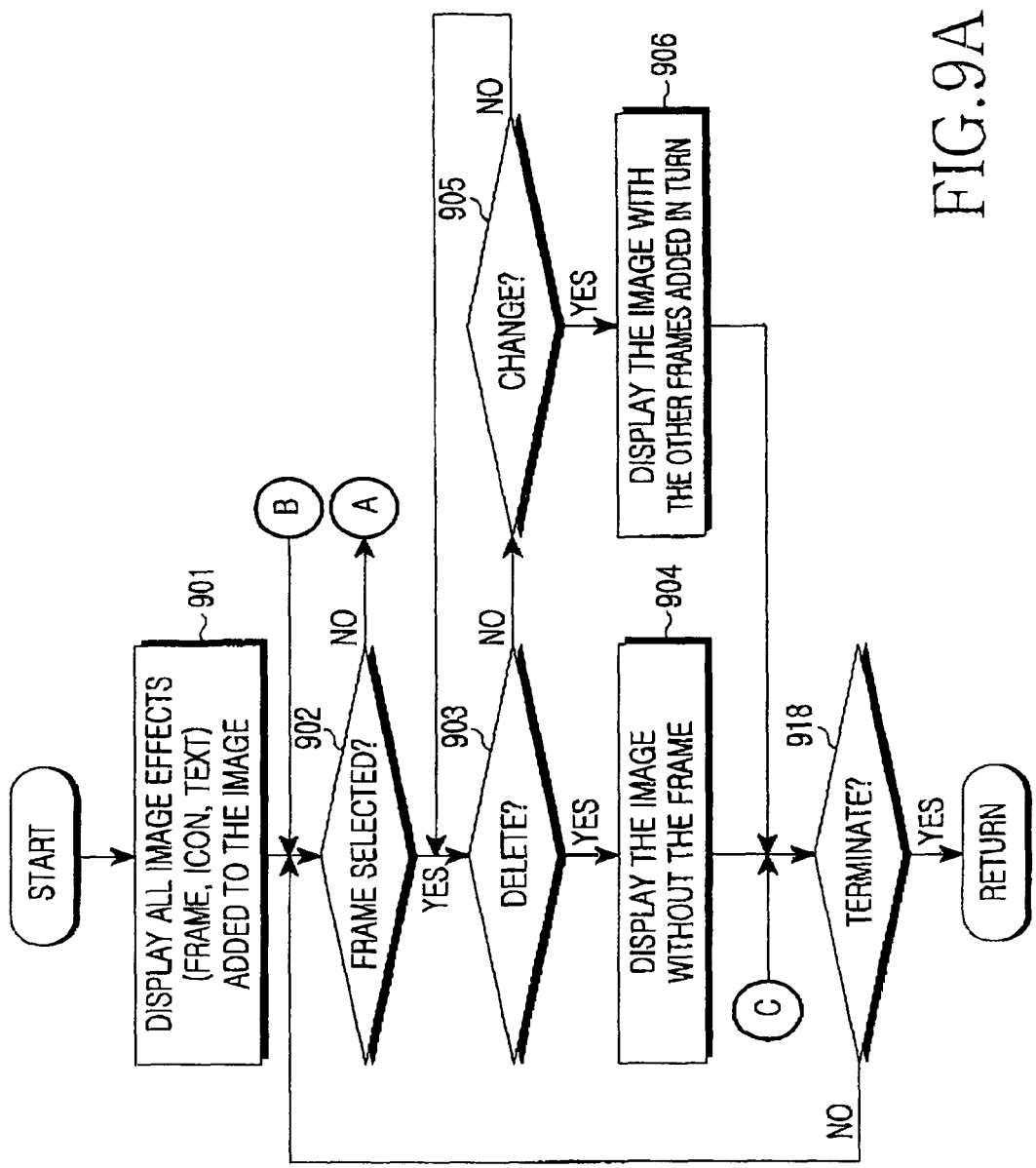
FIGS. 9A to 9B are flow charts illustrating the deletion of an image effect in the process shown in FIG. 2.
Figure 9B:
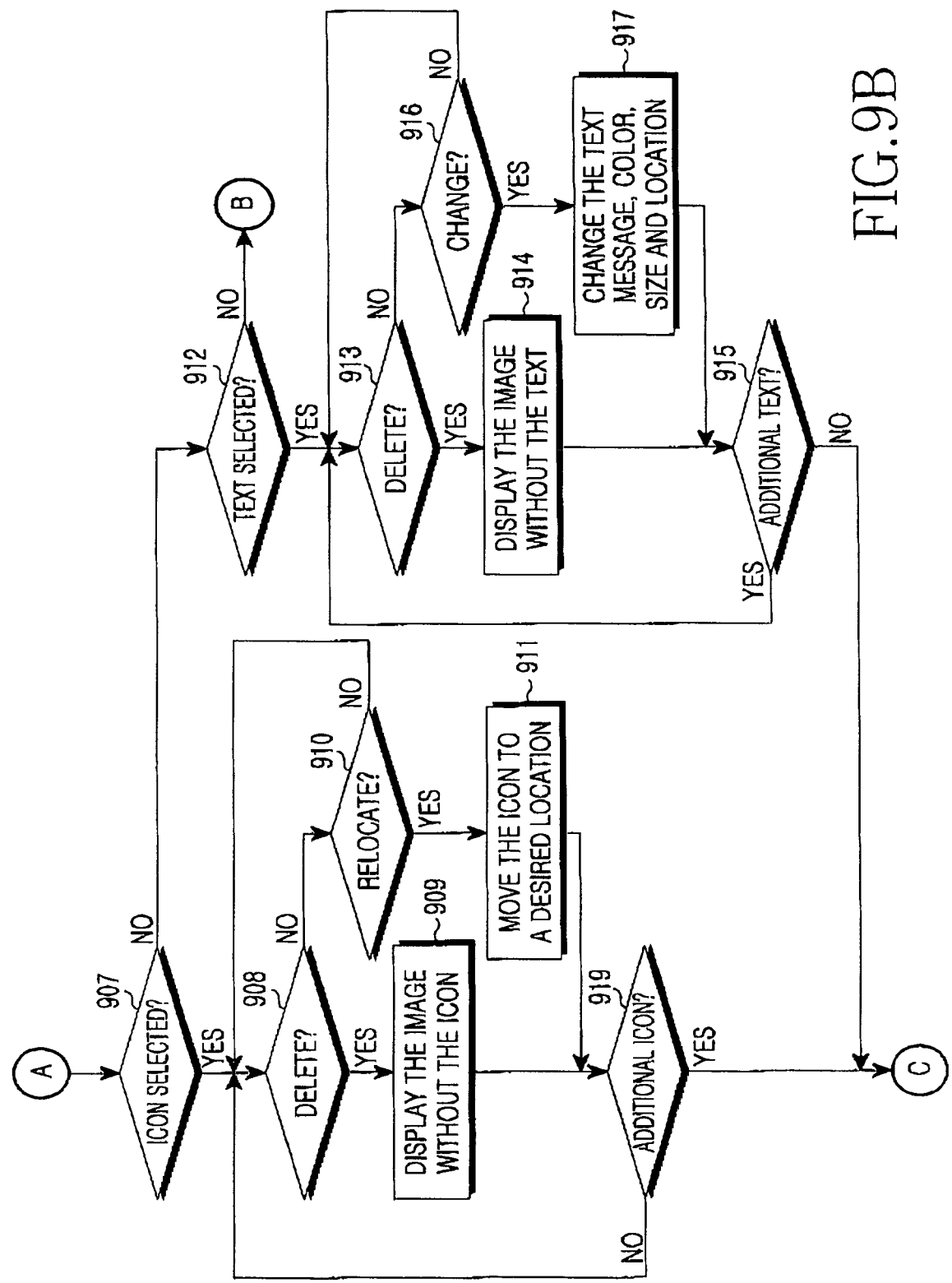
Figure 10A:
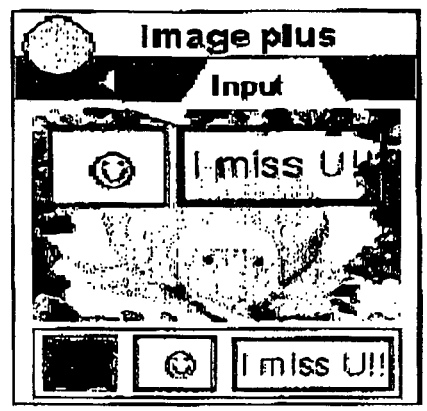
FIGS. 10A to 10D are images illustrating the process shown in FIG. 9.
Figure 10B:
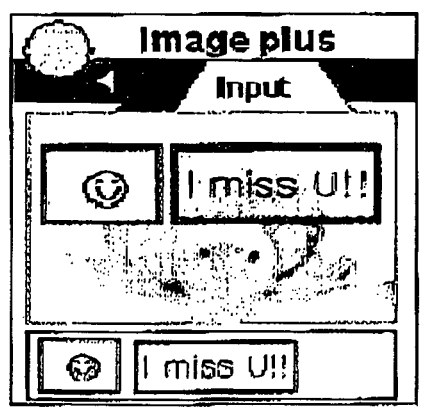
Figure 10C:
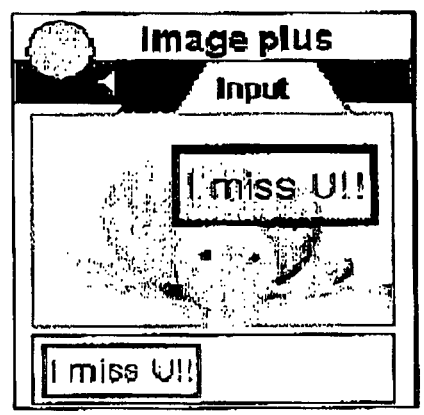
Figure 10D:
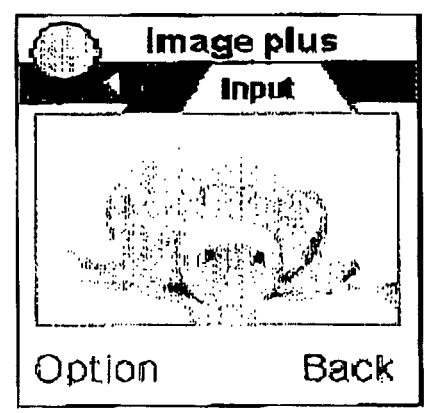
Figure 11:
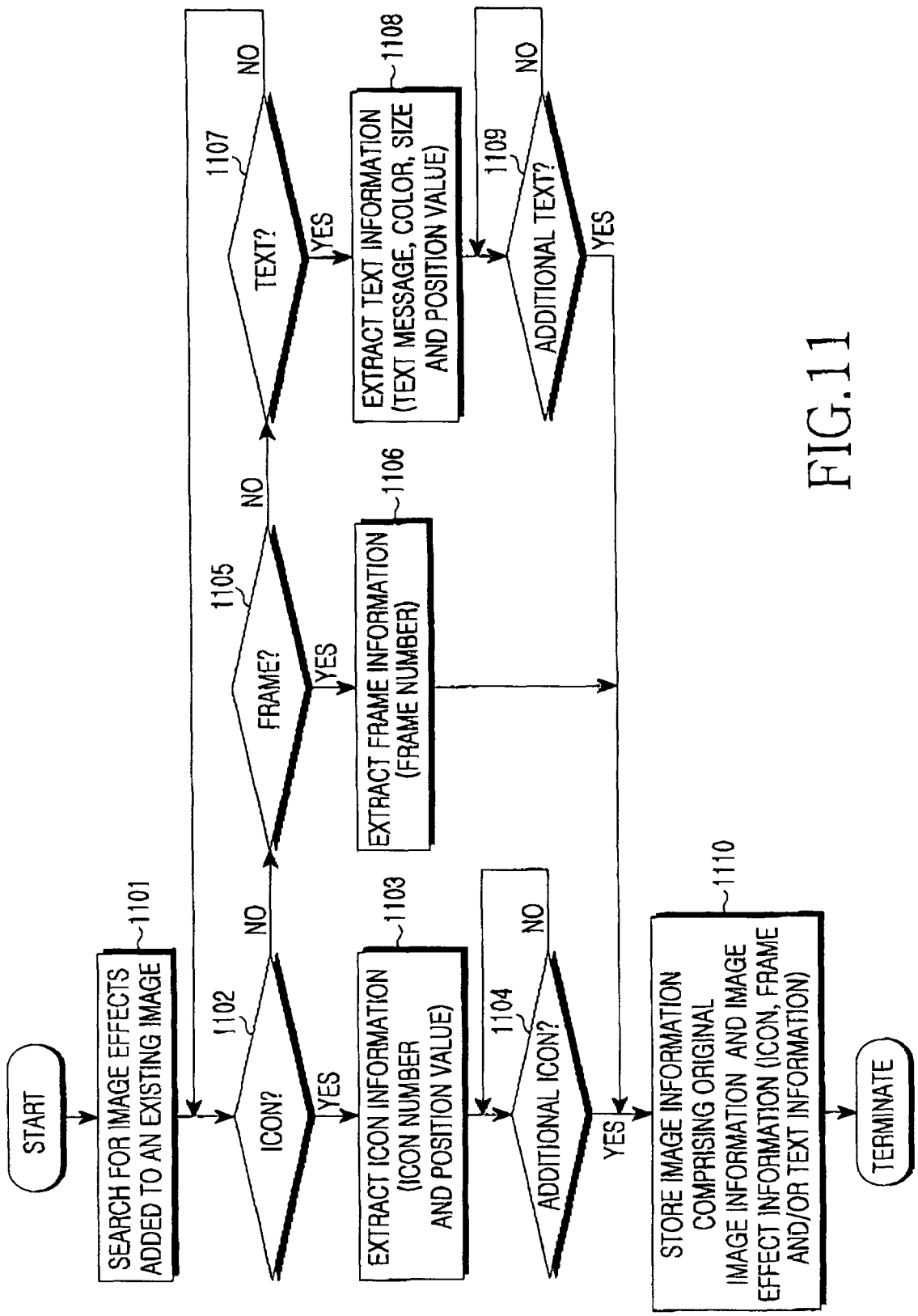
FIG. 11 is a flow chart illustrating a process of storing the image effects-added image shown in FIG. 2.
Figure 12A:
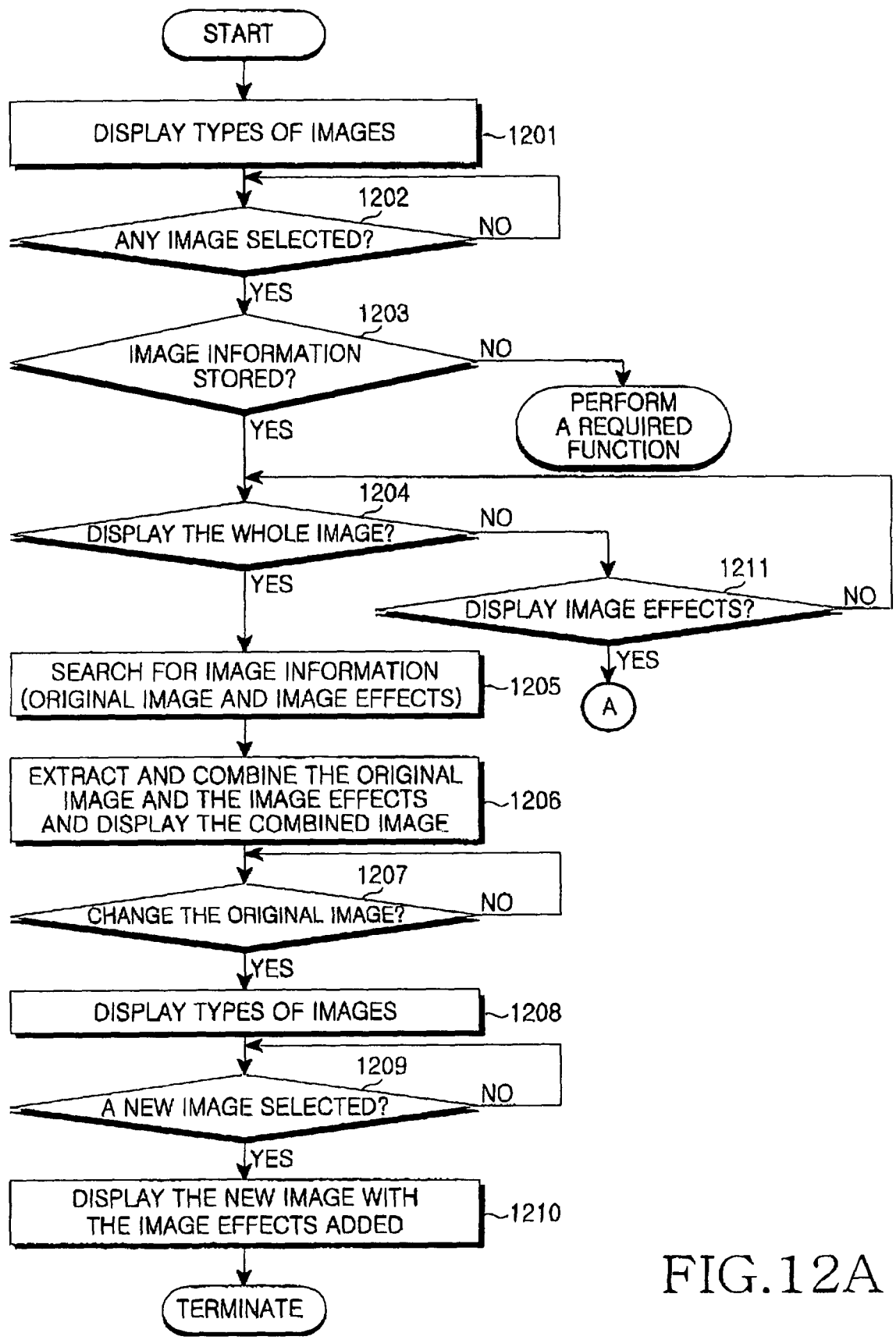
FIGS. 12A and 12B are flow charts illustrating the output and display of an image stored in a mobile terminal according to an embodiment of the present invention.
Figure 12B:
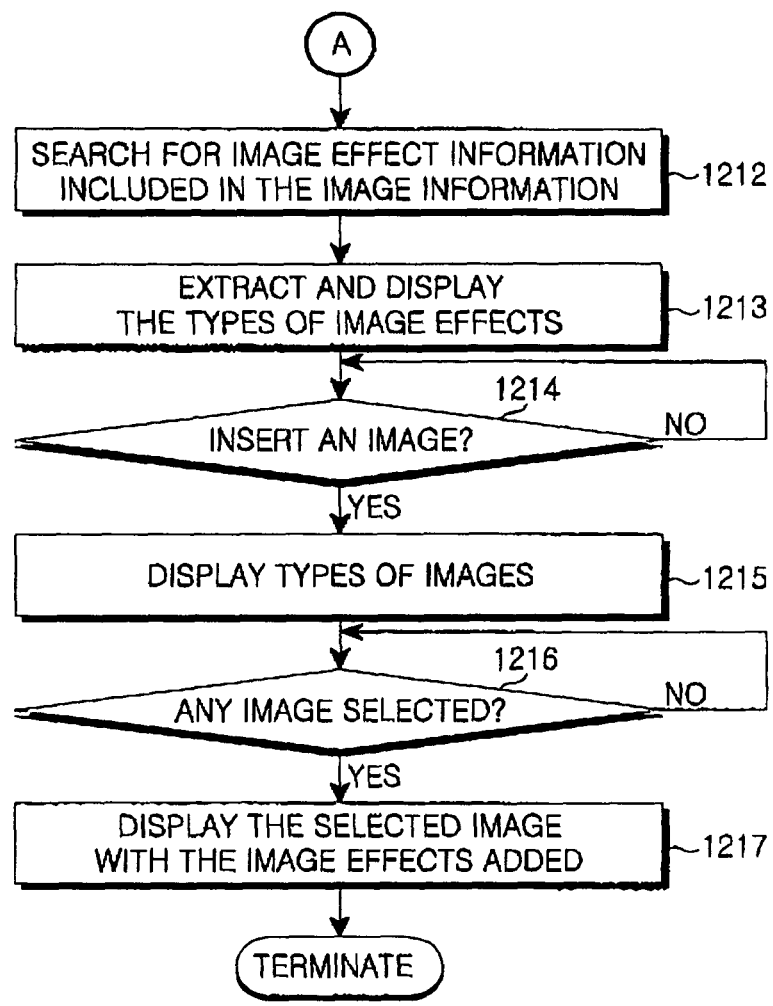

FIG. 2 is a flow chart illustrating a process of adding image effects to an existing image and selectively deleting the added image effects in a mobile terminal according to an embodiment of the present invention. FIG. 3 is a flow chart illustrating the addition of a frame to an existing image as an image effect shown in FIG. 2. FIGS. 4A to 4C are images illustrating the process shown in FIG. 3. FIG. 5 is a flow chart illustrating the addition of an icon to another existing image as an image effect shown in FIG. 2. FIGS. 6A to 6C are images illustrating the process shown in FIG. 5. FIG. 7 is a flow chart illustrating the addition of an icon to an existing image as an image effect shown in FIG. 2. FIGS. 8A to 8C are images illustrating the process shown in FIG. 7. FIGS. 9A to 9B are flow charts illustrating the deletion of another image effect in the process of FIG. 2. FIGS. 10A to 10D are images illustrating the process shown in FIG. 9. FIG. 11 is a flow chart illustrating a process of storing the image effects-added image shown in FIG. 2. FIGS. 12A and 12B are flow charts illustrating the output and display of an image stored in a mobile terminal according to an embodiment of the present invention. Referring to FIG. 2, the mobile terminal displays an image selected by the user from among the stored images on the display section 160 at step 201. When the user presses a select key for selecting a image editing menu, the control section 110 detects the key input at step 202 and proceeds to step 203. When the user selects the addition of a frame from the image editing menu at step 203, the control section 110 detects the selection at step 204 and performs a function to add a selected frame to the displayed image at step 300.

The addition of a frame will be explained in further detail with reference to FIGS. 3 and 4. When the user selects the addition of a frame, the control section 110 detects the selection at step 204 and displays types of frames at step 301. FIG. 4A shows the image selected and displayed at step 201. FIG. 4B shows various types of frames displayed at step 301. When the user selects one of the frames displayed at step 301, the control section 110 detects the selection at step 302 and proceeds to step 303 to display the original image with the selected frame added. FIG. 4C shows the image with the selected frame added thereto. When the user selects a change of frame at step 303, the control section 110 detects the selection at step 304 and proceeds to step 305. At step 305, the control section 110 detects if the user presses a frame change key, for example, a direction key, to apply another frame and displays the image with different frames added in turn. When the user selects one of the sequentially displayed images with different frames, the control section 110 detects the selection at step 306 and displays the image with the newly-selected frame at step 307. When the user selects deletion of a frame added to the original image, the control section 110 detects the selection at step 308 and proceeds with step 309 to display the original image without the frame.

When the user selects the addition of an icon as another image effect at step 203, the control section 110 detects the selection at step 205 and performs a function to add the selected icon to the displayed original image at step 500.

Step 500 for adding an icon will be explained in further detail with reference to FIGS. 5 and 6. When the user selects the addition of an icon, the control section 110 detects the selection at step 205 and displays types of icons at step 501. FIG. 6A shows the original image selected and displayed at step 201. FIG. 6B shows various types of icons displayed at step 501. When the user selects one of the icons displayed at step 501, the control section 110 detects the selection at step 502 and proceeds to step 503 to display the original image with the selected icon added. FIG. 6C shows the image with the selected icon added thereto. When the user selects a change in the location of the icon added at step 503, the control section 110 detects the selection at step 504 and proceeds to step 505. At step 505, the control section 110 detects each time the user presses an icon moving key, for example, a direction key, to change the location of the icon and displays the image with the icon added to different locations in turn. When the user selects a specific location, the control section 110 detects the selection at step 506 and displays the image with the icon added to the selected location at step 507. When the user selects any additional icons, the control section 110 detects the selection at step 508 and returns to step 501. When the user selects deletion of an icon added to the original image, the control section 110 detects the selection at step 509 and proceeds to step 510 to display the original image without the icon. The icons that can be added to an image include photo image icons that are photo images in an icon format.

When the user selects the addition of text as another image effect at step 203, the control section 110 detects the selection at step 206 and performs a function to add text to the displayed image at step 700.

Step 700 for adding text to an image will be described in detail with reference to FIGS. 7 and 8. When the user selects the addition of text, the control section 110 detects the selection at step 206 and displays a text input window at step 701. The user can input text into the text input window at step 702. FIG. 8A shows the image selected and displayed at step 201. FIG. 8B shows the text input window with a text message input at step 702. When the user presses a select key for creating a text effect on the image, the control section 110 detects the key input at step 703 and proceeds to step 704 to display the types of text effects. When the user selects the insertion of the input text message, the control section 110 detects the selection at step 705 and proceeds with step 706 to display the original image with the text message inserted. FIG. 8C shows the image with the text message inserted. When the user selects a change to the inserted text message, the control section 110 detects the selection at step 707 and proceeds to step 708. At step 708, the user can replace the previous text message with a newly input message. When the user selects a change in the text color, the control section 110 detects the selection at step 709 and proceeds to step 710 to enable the user to select a desired color for the input text. When the user selects a change in the text size, the control section 110 detects the selection at step 711 and proceeds to step 712 to enable the user to adjust or change the size of the input text. When the user selects a change in the text location, the control section 110 detects the selection at step 713 and proceeds to step 714. At step 714, the control section 110 displays the text message placed at different locations on the image according to the user's pressing of a location key, for example, a direction key. When the user selects a help, the control section 110 controls the display section 160 to display a help for adding text to an image. When the user selects termination of text addition, the control section 110 detects the selection at step 715 and terminate the text adding process.

When the user selects deletion of the text added to the image, the control section 110 detects the selection at step 716 and proceeds to step 717 to display the image without the text.

When the user selects modification or deletion of an image effect from the image editing menu displayed at step 203, the control section 110 detects the selection at step 207 and proceeds to step 900 to perform a focus function.

Step 900 for performing a focus function to modify or delete an image effect will be explained in further detail with reference to FIGS. 9A, 9B and 10. When the user selects the focus function, the control section 110 detects the selection at step 207 and generates a focus window at step 901. The focus window generated at step 901 displays the original image and the image effects added to the original image at step 300, 500 or 700. FIG. 10A shows the focus window generated at step 901 to display the image effects added to the original image. The user can select any of the image effects displayed at step 901 to perform the focus function for modifying or deleting the selected image effect.

When the user selects the frame from among the image effects displayed in the focus window at step 901, the control section 110 detects the selection at step 902 and prepares to perform the focus function on the selected frame. When the user selects deletion of the frame, the control section 110 detects the selection at step 903 and proceeds to step 904 to display the image without the frame. FIG. 10B shows the image with the frame selected at step 904 deleted. The focus function includes modification of an image effect added to the original image. When the user selects modification of the above frame, the control section 110 detects the selection at step 905 and proceeds to step 906 to display the image with different frames added in turn by the user. Step 906 is substantially identical to step 305 shown in FIG. 3.

When the user selects the icon from among the image effects displayed in the focus window at step 901, the control section 110 detects the selection at step 907 and locates a cursor on the icon inserted in the image. When the user selects deletion of the icon, the control section 110 detects the selection at step 908 and proceeds with step 909 to display the image with the icon deleted. FIG. 10C shows the image with the icon selected at step 909 deleted. When the user selects another icon to be deleted from the image, the control section 110 detects the selection at step 919 and returns to step 907. When the user selects relocation of a selected icon, the control section 110 detects the selection at step 910 and proceeds to step 911 to move the location of the selected icon. Step 911 is substantially identical to step 505 shown in FIG. 5.

When the user selects the text among the image effects displayed in the focus window at step 901, the control section 110 detects the selection at step 912 and locates a cursor on the text inserted in the image. When the user selects deletion of the text, the control section 110 detects the selection at step 913 and proceeds to step 914 to display the image without the text. FIG. 10D shows the image with the text selected at step 914 deleted. When the user selects another text to be deleted from the image, the control section 110 detects the selection at step 915 and proceeds again with step 912. When the user selects modification of any text, the control section 110 detects the selection at step 916 and proceeds to step 917 to change the input message, color, size or location of the text. Step 917 is substantially identical to steps 707 to 714 shown in FIG. 5. The user can selectively delete or modify any of the image effects added to the original image using the focus function in FIG. 9, regardless of the order of the addition of the image effects.

When the user selects undo from the image editing menu displayed at step 203, the control section 110 detects the selection and performs an undo function to cancel the previous edit and restore the image to the condition that existed before editing was done.

When the user selects save from the image editing menu displayed at step 203, the control section 110 detects the selection at step 208 and proceeds to step 210 to store the image with the image effects added by the user.

Step 1100 for performing a save function will be explained in further detail with reference to FIG. 11. When the user selects the save function for the image, the control section 110 detects the selection at step 208 and detects if any image effect is added to the image. Upon detecting an image effect added to the image, the control section 110 proceeds to step 1101 to determine the type of the image effect. If the image effect is an icon, the control section 110 will detect this image effect type at step 1102 and proceed to step 1103 to extract and store corresponding icon information. At step 1103, the control section 110 extracts an icon number representing the type of icon and a position value of the icon added to the original image and stores the extracted information. Steps 1103 and 1104 are performed to extract information about at least one icon added to the original image.

If the image effect is a frame, the control section 110 will detect this image effect type at step 1105 and proceed to step 1106 to extract and store corresponding frame information. Specifically, at step 1106, the control section 110 extracts and stores a frame number representing the type of frame added to the original image.

If the image effect is text, the control section 110 will detect this image effect type at step 1107 and proceed to step 1108 to extract and store corresponding text information. Specifically, at step 1108, the control section 110 extracts and stores an input message, color, size and position value of the text added to the original image. Steps 1108 and 1109 are performed to extract information about at least one text added to the original image. Specifically, at step 1109, a determination is made as to whether additional text is detected.

Upon extraction of the image effect information through steps 1101 to 1109, the control section 110 proceeds to step 1110 to store only image information comprising the extracted image effect information and the original image information.

The control section 110 can separately store the image effects added to the original image according to the user's selection. At this time, the image effects can be stored as image effect information.

When the user selects help from the image editing menu displayed at step 203, the control section 110 detects the selection and controls the display section to display a help screen explaining how to add an image effect. When the user selects an end option from the image editing menu displayed at step 203, the control section 110 detects the selection at step 209 and terminates the image editing process.

The output and display of a stored image in FIG. 11 will be explained in further detail with reference to FIGS. 12A and 12B.

Referring to FIG. 12A, when the user selects viewing images stored in the mobile terminal, the control section 110 detects the selection and proceeds to step 1201 to display the types of images stored in the memory 130.

When the user selects one of the types of images displayed at step 1201, the control section 110 detects the selection at step 1202 and searches for stored information about the selected image. If the selected image is stored as image information, the control section 110 will display the image display types at step 1203.

When the user selects whole image display among the image display types, the control section 110 detects the selection at step 1204 and proceeds to step 1205 to search for image information of the image selected at step 1202. At step 1205, the control section 110 searches for original image information of the selected image and image effect information such as a frame, icon and/or text added to the original image.

After the image information search, the control section 110 proceeds to step 1206 to extract the original image corresponding to the original image information from the memory 130 and a frame, at least one icon and at least one text corresponding to the image effect information from the memory 130. At step 1206, the control section 110 combines the extracted original image with the extracted image effects by adding the frame to the original image, placing the icon at a preset location of the original image and inserting the text in preset color and size in the preset location of the original image, and displays the combined image.

When the user selects a change of the original image during the display of the combined image, the control section 110 detects the selection at step 1207 and proceeds to step 1208 to display the types of images stored in the memory 130. When the user selects one of the displayed types of images, the control section 110 detects the selection at step 1209 and proceeds to step 1210 to display the newly selected image with the image effects added. When the user selects two or more images at step 1209, the control section 110 displays the two or more selected images in turn at every predetermined time interval with the image effects added.

When the user selects image effect display among the image display types, the control section 110 detects the selection at step 1211 and proceeds to step 1212 (FIG. 12B) to search for image effect information included in the image information of the image selected at step 1202. Alternatively, when the user selects one of the separately stored image effects, the control section 110 detects the selection and searches for image effect information corresponding to the selected image effect at step 1212.

Referring to FIG. 12B, at step 1212, the control section 110 searches for image effect information such as a frame, icon and/or text added to the original image. After the search for image effect information, the control section 110 proceeds to step 1213 to extract a frame, at least one icon and at least one text corresponding to the image effect information from the memory 130 and display the extracted image effects. At step 1213, the control section 110 displays the extracted icon at a location corresponding to the preset position value, without displaying the original image. The control section 110 displays the extracted frame. Also, the control section 110 displays the extracted text in the preset color and size at a location corresponding to the preset position value.

When the user selects insertion of an image during the display of the image effects only, the control section 110 detects the selection at step 1214 and proceeds to step 1215 to display the types of images stored in the memory 130.

When the user selects one of the displayed types of images, the control section 110 detects the selection at step 1216 and proceeds to step 1217 to display the selected image with the image effects added. When the user selects two or more images, the control section 110 displays the two or more selected images in turn at every predetermined time interval with the image effects added. In accordance with an embodiment of the present invention, various image effects can be added to an existing image stored in a mobile terminal, thereby enabling various changes to the existing image. The user can add an image effect to any desired location of the image. It is also possible to add multiple image effects to a single image. Using the focus function, the user can selectively delete or modify any of the added image effects. The user can display the image edited with various image effects on the mobile terminal and store the image in an external device via a communication interface. The user can also send the edited image to the base station so that the image can be transmitted to other subscribers. It is possible to store only image information of the images with various image effects added to effectively use the memory. It is also possible to apply different images to preset image effects, thereby eliminating the inconvenience in adding the same image effects to each existing image.

Although embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. An image display method for a mobile terminal, the image display method comprising:
    displaying an image;
    displaying a plurality of image effects; and
    adding an image effect selected among the plurality of displayed image effects to the image so that the selected image effect may overlap the image, and displaying the image with the selected image effect added;
    displaying a focus window, which displays a type of the image effect added to the image, while displaying the image with the image effect added, if a focus function is selected; and
    applying an editing result of a particular image effect to the focus window and the image, if editing of the particular image effect displayed on the focus window is performed.

2. The image display method of claim 1, further comprising:
    displaying a plurality of icons, if addition of an icon is selected among types of image effects during the displaying of the image;
    adding an icon selected among the plurality of displayed icons to the image, so that the selected icon may overlap the image, and displaying the image with the selected icon added; and
    moving the icon to a location designated by a user on the image and displaying the icon in the location on the image, if relocation of the icon is selected during the displaying of the image with the selected icon added.

3. The image display method of claim 1, further comprising:
    adding an input text to the image and displaying the image with the text added, if addition of the text is selected among the types of the image effects during the displaying of the image; and
    moving the text to a location designated by a user on the image and displaying the text in the location on the image, if relocation of the text is selected during the displaying of the image with the selected text added.

4. The image display method of claim 1, wherein applying the editing result of the particular image effect to the focus window and the image further comprises:
    applying modification of a particular image effect, which is randomly selected on the focus window, to the focus window and the image and displaying the modification-applied focus window and image, if the modification of the particular image effect randomly selected on the focus window is performed; and
    applying deletion of a particular image effect, which is randomly selected on the focus window, to the focus window and the image, if the deletion of the particular image effect randomly selected on the focus window is performed.

5. The image display method of claim 4, wherein if an icon is selected and modified on the focus window, a type or location of the icon is changed, and if a text is selected and modified on the focus window, a size or location of the text is changed.

6. The image display method of claim 1, further comprising: extracting information regarding the original image and information regarding the image effect for the image with the image effect added, if storage of the image with the image effect added is selected during the displaying of the image with the image effect added; and
    storing image information comprising the extracted information regarding the original image and the extracted information regarding the image effect.

7. The image display method of claim 6, wherein the extracting of the information regarding the image effect comprises:
    extracting information regarding an icon, which comprises at least one of an icon number indicating a type of the icon and a position value of the icon, if the image effect added to the image is the icon; and
    extracting information regarding a text, which comprises at least one of message, color, size, and position of the text, if the image effect added to the image is the text.

8. The image display method of claim 1, further comprising: displaying a plurality of images stored in the terminal, if image display is selected;
    searching for image information regarding a particular image selected among the plurality of images, if the selected particular image is stored as the image information;
    extracting the original image and the type of the image effect regarding the particular image by using the found image information; and
    combining the extracted original image with the extracted image effect and displaying the combined image.

9. The image display method of claim 8, further comprising: displaying the plurality of images stored in the terminal, if change of the original image is selected during the displaying of the combined image of the extracted original image and the extracted image effect; and
    combining the extracted image effect with at least one image selected among the plurality of images and displaying the combined image, if the at least one image is selected among the plurality of images.

10. The image display method of claim 8, further comprising:
    extracting a type of the image effect, by using the searched image information;
    displaying the plurality of images stored in the terminal, if insertion of the original image is selected during the displaying of the extracted type of the image effect; and
    combining a particular image selected among the plurality of images with the extracted type of the image effect and displaying the combined image, if the particular image is selected among the plurality of images.

11. An image display apparatus for a mobile terminal, the image display apparatus comprising:
- a display for displaying an image with an image effect added; and
- a controller for displaying a plurality of image effects adding an image effect selected among the plurality of displayed image effects to the image so that the selected image effect may overlap the image and displaying the image with the selected image effect added, displaying a focus window, which displays a type of the image effect added to the image, while displaying the image with the image effect added, if a focus function is selected, and applying an editing result of a particular image effect to the focus window and the image, if editing of the particular image effect displayed on the focus window is performed.

12. The image display apparatus of claim 11, wherein the controller:
- displays a plurality of icons, if addition of an icon is selected among types of image effects during the displaying of the image, adds an icon selected among the plurality of displayed icons to the image, so that the selected icon may overlap the image, displays the image with the selected icon added, and moves the icon to a location designated by a user on the image and displays the icon in the location on the image, if relocation of the icon is selected during the displaying of the image with the selected icon added.

13. The image display apparatus of claim 11, wherein the controller adds an input text to the image and displays the image with the text added, if addition of the text is selected among the types of the image effects during the displaying of the image, and moves the text to a location designated by a user on the image and displays the text in the location on the image, if relocation of the text is selected during the displaying of the image with the selected text added.

14. The image display apparatus of claim 11, wherein the controller:
- applies modification of a particular image effect, which is randomly selected on the focus window, to the focus window and the image and displays the modification-applied focus window and image, if the modification of the particular image effect randomly selected on the focus window is performed; and
- applies deletion of a particular image effect, which is randomly selected on the focus window, to the focus window and the image, if the deletion of the particular image effect randomly selected on the focus window is performed.

15. The image display apparatus of claim 14, wherein if an icon is
- selected and modified on the focus window, the controller changes a type or location of the icon, and if a text is selected and modified on the focus window, the controller changes a size or location of the text.

16. The image display apparatus of claim 11, wherein the controller:
- extracts information regarding the original image and information regarding the image effect for the image with the image effect added, if storage of the image with the image effect added is selected during the displaying of the image with the image effect added; and
- stores image information comprising the extracted information regarding the original image and the extracted information regarding the image effect.

17. The image display apparatus of claim 16, wherein the controller:
- extracts information regarding an icon, which comprises at least one of an icon number indicating a type of the icon and a position value of the icon, if the image effect added to the image is the icon; and
- extracts information regarding a text, which comprises at least one of message, color, size, and position of the text, if the image effect added to the image is the text.

18. The image display apparatus of claim 11, wherein the controller displays a plurality of images stored in the terminal if image display is selected, searches for image information regarding a particular image selected among the plurality of images if the selected particular image is stored as the image information, extracts the original image and the type of the image effect regarding the particular image by using the found image information, and combines the extracted original image with the extracted image effect and displays the combined image.

19. The image display apparatus of claim 18, wherein the controller displays the plurality of images stored in the terminal if change of the original image is selected during the displaying of the combined image of the extracted original image and the extracted image effect, and combines the extracted image effect with at least one image selected among the plurality of images and displays the combined image if the at least one image is selected among the plurality of images.

20. The image display apparatus of claim 18, wherein the controller extracts a type of the image effect by using the search image information, displays the plurality of images stored in the terminal if insertion of the original image is selected during the displaying of the extracted type of the image effect, and combines a particular image selected among the plurality of images with the extracted type of the image effect and displays the combined image if the particular image is selected from among the plurality of images.

21. An image display method for a mobile terminal, the image display method comprising:
- displaying an image;
- displaying a plurality of icons if addition of an icon is selected among types of image effects during the displaying of the image;
- adding an icon selected among the plurality of displayed icons to the image so that the selected icon may overlap the image and displaying the image with the selected icon added;
- displaying a edit menu, which displays a type of the image effect editable, if a focus function is selected; and
- applying an editing result of a particular image effect to the image, if editing of the particular image effect selected on the edit menu is performed.

22. An image display apparatus for a mobile terminal, the image display apparatus comprising:
- a display configured to display an image with an image effect added; and
- a controller configured to display a plurality of icons if addition of an icon is selected among types of image effects during the displaying of the image, add an icon selected among the plurality of displayed icons to the image so that the selected icon may overlap the image, display the image with the selected icon added, display a edit menu, which displays a type of the image effect editable, if a focus function is selected, and apply an editing result of a particular image effect to the image, if editing of the particular image effect selected on the edit menu is performed.

* * * * *